United States Patent
Nohara

[19]

[11] Patent Number: 5,914,874
[45] Date of Patent: Jun. 22, 1999

[54] AUTOMATIC APPLICATION RESTARTING SYSTEM AND METHOD

[75] Inventor: Arito Nohara, Kanagawa, Japan

[73] Assignee: Fuji Xerox Co., Ltd., Tokyo, Japan

[21] Appl. No.: 08/544,028

[22] Filed: Oct. 17, 1995

[30] Foreign Application Priority Data

Apr. 18, 1995 [JP] Japan ................................. 7-116549

[51] Int. Cl.⁶ ............................................. G05B 19/00
[52] U.S. Cl. .................... 364/184; 364/130; 702/119; 702/123; 395/182.13; 395/670; 395/677
[58] Field of Search ............................. 364/184, 130, 364/136, 147, 550, 551.01, 580, 579, 266.5, 285.2, 945, 945.2, 976.4; 395/618, 677, 670, 182.13–182.15, 182.02; 399/21, 18, 19, 77; 702/119, 123, 183, 185, 186, 188; 707/202

[56] References Cited

U.S. PATENT DOCUMENTS

| | | | |
|---|---|---|---|
| 4,912,628 | 3/1990 | Briggs | 395/670 |
| 5,107,299 | 4/1992 | Farrell et al. | 399/19 |
| 5,182,597 | 1/1993 | Masuda et al. | 399/21 |
| 5,301,103 | 4/1994 | Sakamot et al. | 364/184 |
| 5,404,532 | 4/1995 | Allen et al. | 395/182.02 |
| 5,424,808 | 6/1995 | Maekawa et al. | 399/18 |
| 5,617,532 | 4/1997 | Ushiyama | 395/182.13 |

*Primary Examiner*—Hal Dodge Wachsman
*Attorney, Agent, or Firm*—Finnegan, Henderson, Farabow, Garrett & Dunner, L.L.P.

[57] ABSTRACT

In a multi-tasking operating system, when an application has terminated, a termination discriminator designating section designates a termination discriminator (termination code) the content of which indicates restartability or non-restartability of the application. When the state of termination of the application has been detected by an application termination detecting section, a termination discriminator determining section receives a termination discriminator and determines the content thereof. When the termination discriminator determining section has determined according to the termination discriminator that the application is restartable, an application start-up section restarts the application.

7 Claims, 2 Drawing Sheets

AUTOMATIC APPLICATION RESTARTING SYSTEM AND METHOD

FIELD OF THE INVENTION

The present invention relates to an automatic application restarting system and, more particularly, to an automatic application restarting system and method which monitors the termination state of an application and restarts the application only when it is capable of being restarted. The present invention further relates to a computer program that executes the aforementioned automatic application restarting system and method.

BACKGROUND OF THE INVENTION

Conventional automatic application restarting system techniques are disclosed in, for example, Japanese Patent Publication No. Hei. 6-202861, Japanese Patent Publication No. Hei. 6-266573, etc.

The automatic application restarting system disclosed in Japanese Patent Publication No. Hei 6-202861 comprises a termination discriminating file-producing means, termination discriminating file-erasing means, and restart determining means. According to this structure, before an application is started, the termination discriminating file-producing means produces a termination discriminating file which includes a command name for starting the application. The termination discriminating file is stored in a secondary memory device. If the application has terminated normally, the termination discriminating file-erasing means receives a normal termination code from the CPU and erases the termination discriminating file stored in the secondary memory device. If the application has terminated abnormally, the termination discriminating file is left as is.

Meanwhile, the restart determining means examines the presence or absence of the termination discriminating file in the secondary memory device when the application has terminated, and, when the termination discriminating file is present, the restart determining means restarts the application. Therefore, when abnormal termination of the application has occurred, the application is automatically restarted by using the starting command stored in the secondary memory device. As such, this saves in the time and labour of that would be otherwise be required to re-input the starting command of the application.

A trouble recovery information managing system which is disclosed in Japanese Patent Publication No. Hei. 6-266573 is configured to automatically restart, at high speed, a computer in which trouble has occurred. In this system, a most recent termination code and an immediately preceding termination code are prepared. During the restarting process, these two codes are read and when it is determined that the kind of trouble in both occurrences is the same and the time and date of recording such troubles are different, restarting of the relevant application is commenced. The content of the immediately preceding termination code is updated by the content of the most recent termination code accordingly.

Each of the above-mentioned conventional automatic application restarting systems are configured to determine whether an application is normally or abnormally terminated. However, actually, the content of this abnormal termination includes one case where the termination permits restarting of the application and another case where the termination does not permit restarting thereof or this restarting is not desirable. In the latter case in particular, automatic restarting per se is useless as a step of restarting processing. Furthermore, in the abnormal termination not permitting restarting of the application, there arises the problem that a restarting process and an abnormal termination process are repeated in the form of a loop. For example, in the case of a printer that receives a printing request, but because the content thereof is unsuitable, the printing operation is not appropriately performed, and the printing request and the printing-operation termination are repeated.

SUMMARY OF THE INVENTION

An object of the present invention is to provide an automatic application restarting system and method which, when automatically restarting an application that has been terminated, examines whether or not the application is restartable, restarts only the restartable application, and reliably and smoothly performs the restart process so as to eliminate useless restarts. Another object of the present invention is to provide a computer program that executes the aforementioned automatic application restarting system and method.

According to a first aspect of the present invention, an automatic application restarting system, which automatically restarts a terminated application, comprises termination discriminator designating means for designating a termination discriminator which indicates, upon the termination of the application, either restartability or non-restartability of the application; application termination detecting means for detecting the termination discriminator; termination discriminator determining means for receiving the termination discriminator and determining either the restartability or non-restartability of the application, as indicated by the termination discriminator detected by the application termination detecting means; and application start-up means for restarting the application when the termination discriminator determining means determines the restartability indicated by the termination discriminator.

According to a first aspect of the invention, the termination discriminator designating means designates the termination discriminator as non-restartable when the application is terminated normally or the termination is unrecoverably abnormal; and the termination discriminator designating means designates the termination discriminator as restartable when the termination of the application is recoverably abnormal.

The automatic application restarting system according to the first aspect further comprises a forced restart determining means which determines that the application should be restarted when the termination discriminator determining means cannot determine the termination discriminator designated by the termination discriminator designating means.

The automatic application restarting system according to the first aspect, further comprises a counter means for counting a restart frequency wherein the termination discriminator determining means does not determine that the application is to be restarted when the restarting frequency, as counted by the counter means, exceeds a preset frequency.

According to a second aspect of the present invention, an automatic application restarting method, which automatically restarts a terminated application comprises a step of designating a termination discriminator which, upon the termination of an application, indicates either restartability or non-restartability of the application; a step of detecting the termination discriminator; a step of receiving the termination discriminator and determining either the restartability or non-restartability of the application as indicated by the detected termination discriminator; and a step of restarting the application upon determining the restartability indicated by the termination discriminator.

According to a third aspect of the present invention, a computer program for automatically restarting an application and controlling the computer comprising program code means for designating a termination discriminator which indicates, upon termination of the application, either the restartability or non-restartability of the application; means for detecting the termination discriminator; means for receiving the termination discriminator and determining either the restartability or non-restartability of the terminated application, as indicated by the detected termination discriminator; and means for restarting the application upon determining the restartability of the terminated application indicated by the termination discriminator.

BRIEF DESCRIPTION OF THE DRAWINGS

These and other features, aspects and advantages of the present invention will become better understood with reference to the following descriptions, appended claims and accompanying drawings, in which:

DETAILED DESCRIPTION OF THE PREFERRED EMBODIMENT

Figure 1:
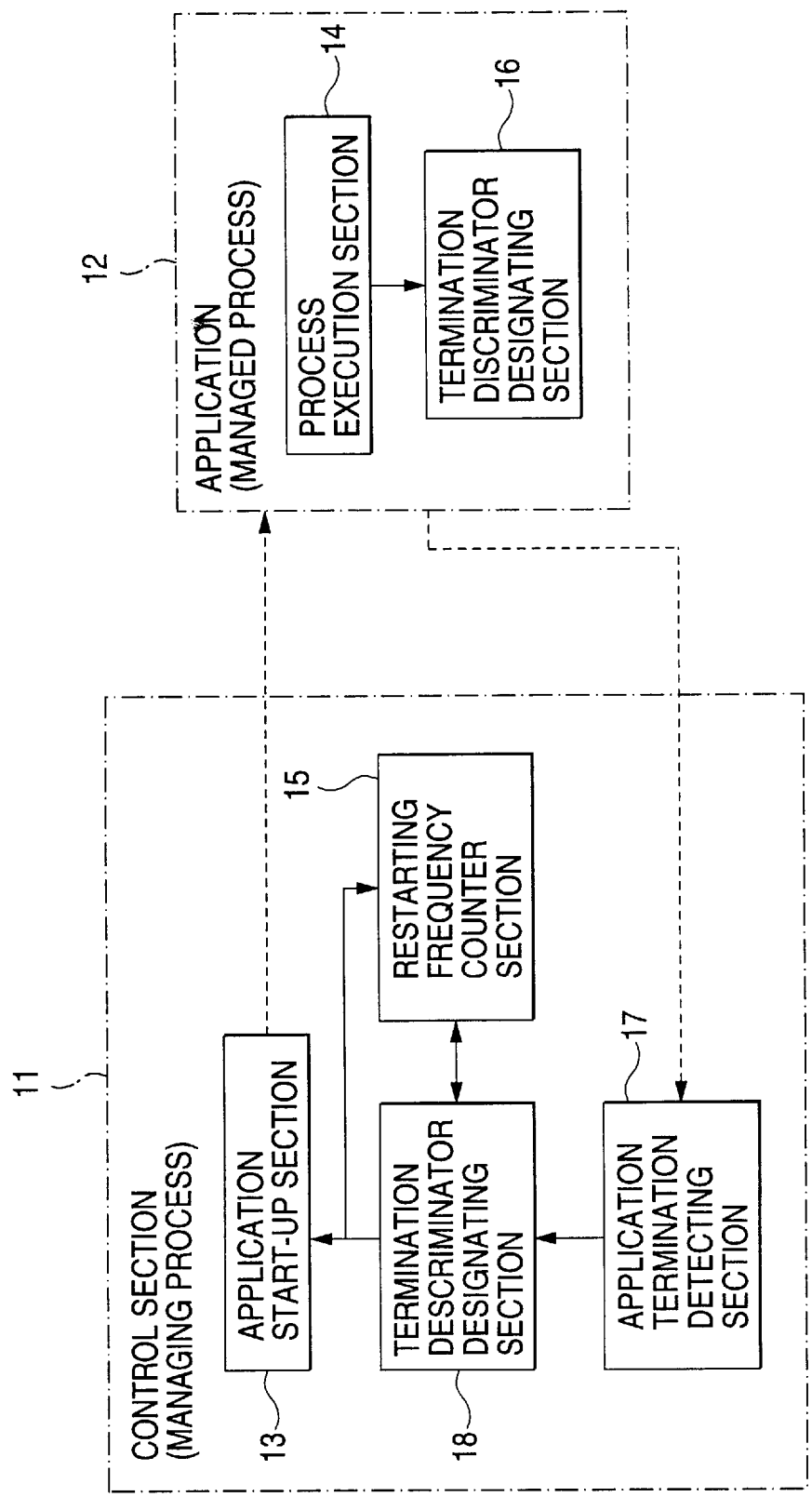
FIG. 1 is a block diagram illustrating a representative embodiment of an automatic restarting system according to the present invention.
Figure 2:
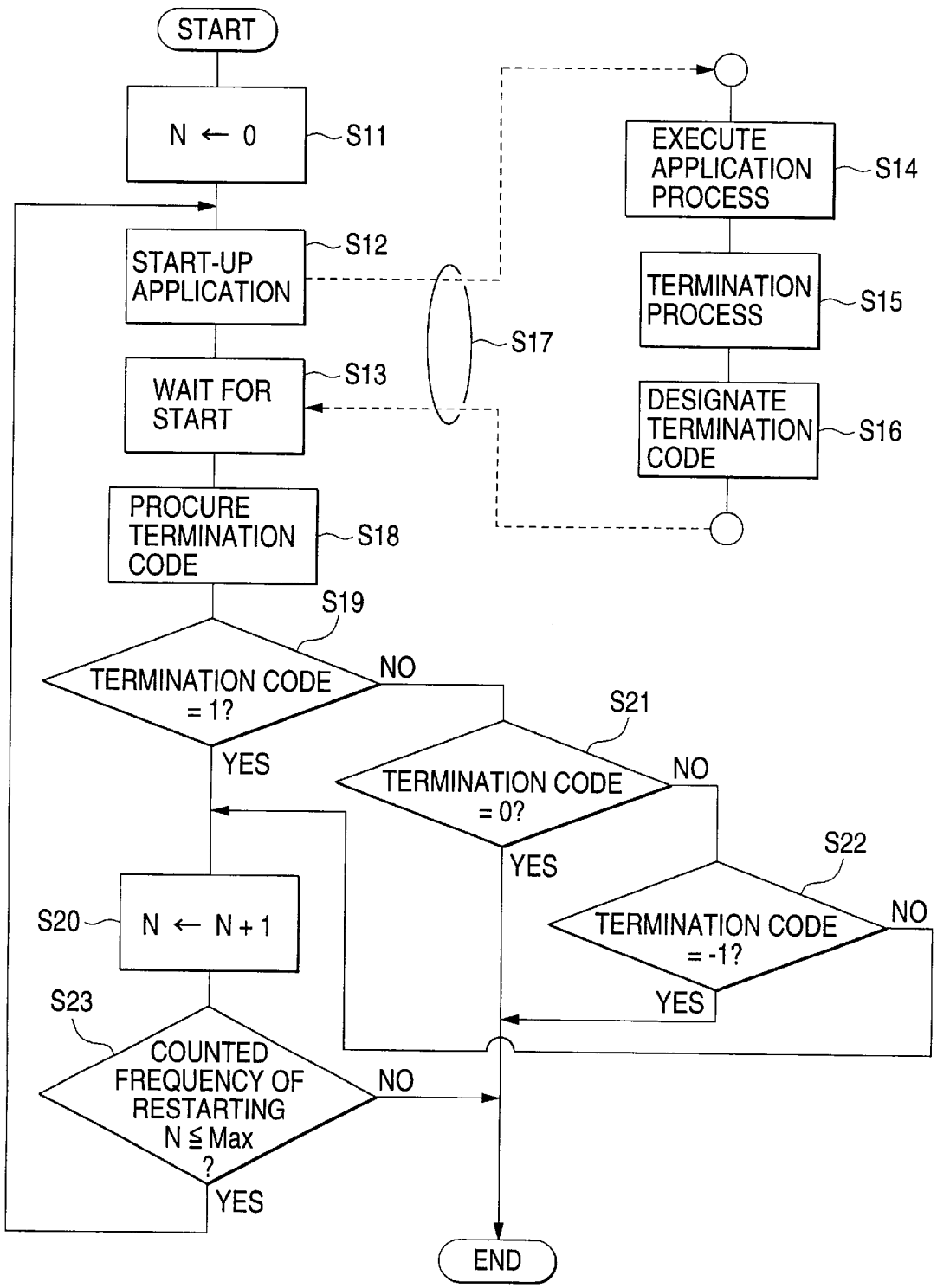
FIG. 2 is a flow chart illustrating the flow of a processing operation for determining whether or not restarting is performed.

A preferred embodiment of the present invention will be described hereunder with reference to FIGS. 1 and 2. FIG. 1 illustrates essential components of an automatic application restarting system according to the present invention and FIG. 2 illustrates the flow of a restarting process.

An explanation will now be given as to the construction of the automatic application restarting system and basic operations of its constituent elements. According to this embodiment, management of the relevant process in the computer system where an application is executed is performed on a multi-task OS (Operating System). In FIG. 1, a control section 11 represents a managing process having the function of managing an application 12 which is executed as a managed process and to start it up (the second start-up and its succeeding start-up operations will be referred to as "restart"). The control section 11 has an application start-up section 13 which gives a start-up command to the application 12 and starts it up for execution. In the application 12, a process execution section 14 is illustrated for convenience as an element portion for executing the process of the application. Also, the control section 11 is equipped with a restarting frequency counter section 15. Before an initial start-up command is supplied to the application 12 from the application start-up section 13, the counted value of the restarting frequency counter section 15 is set to zero. When the start-up command for restarting the application is generated from the application start-up section 13, the frequency with which the second start-up command and subsequent start-up commands are generated is counted as a restarting frequency (N).

The process execution section 14 of the application 12 receives a start-up command from the application startup section 13, reads out a relevant application software portion, and executes a process. When the process terminates for some reason or other, the process execution section 14 supplies termination information to the termination discriminator designating section 16. The termination discriminator designating section 16 receives the termination information, and designates a termination code (termination discriminator) which corresponds to a cause or state of termination of the application 12. The termination code is designated such that a termination code of "0" represents a normal termination; a termination code of "1" represents an abnormal termination permitting the restart of the application; and a termination code of "−1" represents an abnormal termination not permitting the restart of the application. When no termination codes having the above three values are designated, another termination code having another suitable value is designated. The significance of the numerical values of the termination codes is predetermined between the control section 11 and the application 12, whereby, when the termination code has been supplied from the application 12 to the control section 11, the meaning of the relevant numerical values of the termination code can be determined in the control section 11.

In the case of abnormal termination permitting the restart of the application, the termination code is "1". This case occurs, for example, when the application 12 initializes relevant hardware and fails to initialize but there is the likelihood that the process can successfully continue if the application re-initializes. In such a case, the application 12 can designate the termination code "1" and thereby make a request for restarting the application to the managing section 11.

When the relevant process has terminated in the application 12, the control section 11 is notified of this termination by the application 12. The process termination in the application 12 is detected by the application termination detecting section 17. Also, upon notification of the process termination, the termination code designated by the termination discriminator designating section 16 of the application 12 is supplied to an application termination detecting section 17. Upon detection of the process termination in the application 12, the application termination detecting section 17 supplies a termination code to a termination discriminator determining section 18. The termination discriminator determining section 18 determines the significance of the numerical value of the termination code and, on the basis of the numerical value of the termination code, determines whether or not the terminated application should be restarted. When this determination is made, it is concurrently determined, with reference to the frequency of restarting counted by the restarting frequency counter section 15, whether or not the frequency of the restarting to be performed next exceeds a preset frequency of restarting, i.e. a maximum permitted frequency of restarting. When such a prescribed requirement, as later described, has been met, the termination discriminator determining section 18 supplies a start-up instruction command to the application start-up section 13. The application startup section 13, having received the start-up instruction command, supplies a start-up command to the application 12 to thereby start up the application 12. Meanwhile, when the application start-up section 13 outputs the start-up command for restarting the application 12, the restarting section 15 receives the signal from the termination discriminator determining section 18 and counts the frequency of restarting.

Next, the overall operation of the automatic application restarting system having the above-mentioned construction will be explained with reference to the flowchart illustrated in FIG. 2.

First, ordinary initial start-up of the application is performed through the operation of the managing section 11 (step s12). This initial start-up is performed upon supply of a start-up command from the application start-up section 13 of the managing section 11 to the application 12. It should be noted that prior to the execution of step s12, the frequency of restarting (N) is set to zero in the restarting frequency counter section 15 of the managing section 11 (step s11). After step s12 has been executed, an application termination stand-by process (step s13) is performed in the managing section 11, whereby the managing section 11 is placed in a stand-by state of waiting for the notification of termination from the application 12.

Meanwhile, the application 12 receives the start-up command from the managing section 11 side, whereby the process execution section 14 executes an application process (step s14). As mentioned above, the process subsequently terminates due to either a normal termination, an abnormal termination permitting the restarting of the application, an abnormal termination not permitting the restarting of the application, or some other reason (step s15). Upon termination of the execution operation of the process execution section 14, the termination discriminator designating section 16 designates the termination code according to the type of the relevant termination cause (step s16). Namely, when the termination is a normal termination, the designated termination code is "1"; when the termination is a termination permitting the restart of the application, the designated termination code is "1"; and when the termination is an abnormal termination not permitting the restart of the application, the designated termination code is "−1". In addition, if the termination occurs for some other reason than those mentioned above, another numerical value is designated. Upon termination of the process in the application 12, termination notification is supplied from the application 12 to the control section 11.

It should be noted that, in FIG. 2, the relationship indicated by broken lines means step s17 for processes which connect the managing process (control section 11) and the managed process (application 12).

In the managing section 11 which has received termination notification from the application 12, the application termination detecting section 17 procures the relevant termination code (step s18). The termination code procured is sent to the termination discriminator determining section 18 in which the content of this termination code is initially determined. First, when in step s19 the termination code is "1" (i.e., the relevant termination is an abnormal termination permitting restarting of the application), the termination discriminator determining section 18 determines that the application is to be restarted, whereby the processing operation proceeds to step s20. When the termination code is not "1," the processing operation proceeds to a determining step s21 for determining whether or not the termination code is "0". When the termination code is "0" in the determining step s21 (i.e., the relevant termination is a normal termination), the termination discriminator determining section 18 determines that the application is not to be restarted, whereby the processing operation ends. When the termination code is not "0," the processing operation proceeds to a determining step s22 for determining whether or not the termination code is "1". When the termination code is "−1" in the determining step s22 (i.e., the relevant termination is an abnormal termination not permitting restarting of the application), the termination discriminator determining section 18 determines that the application is not to be restarted, whereby the processing operation ends. When the termination code is neither "1," "2", nor "−1," the termination discriminator determining section 18 determines that the application is to attempt a forced restart, and the processing operation proceeds to step s20.

In step s20, because the application is restarted, the value of the restarting frequency N is increased by 1. The counting of this restarting frequency is performed in the restarting frequency counter section 15. In the next step s23, it is determined whether or not the counted value N of restarting is larger than a preset frequency (maximum restarting frequency: Max). When N is less than Max, the processing operation returns to step s12 in which the process of starting-up of the application, i.e. a first restarting process thereof, is performed. That N may become larger than Max signifies that even when restarting is repeatedly (Max times) performed, the processing operation results immediately in an abnormal termination permitting restarting of the application. Therefore, in cases where N is larger than Max, it is determined that restarting is not regularly performed for some reason or other, whereby restarting is no longer performed, and the processing operation ends. The determining process in the determining step s23 is performed with reference to the counted value (N) of the restarting frequency counter section 15 by the termination discriminator determining section 18.

In the construction illustrated in FIG. 1, means for realizing the application start-up section 13 and the application termination detecting section 17 are provided by, for example, an OS (Operating System). Namely, the managing process (control section 11) starts up the process to be managed (application 12) by starting-up of its process. The managing process uses the process at that time as a handle and waits, in its application termination detecting section 17, for termination of the processing operations in the managed process. In the construction of the automatic application restarting system according to this embodiment, it is necessary for at least the managing process (control section 11) which is intended to perform monitoring and the managed process (application 12) which is intended to undergo monitoring to exist.

As is apparent from the foregoing explanations, according to the present invention, in a case where execution of an application in a multi-tasking system terminates and this application is restarted, the state of termination is monitored, the application notifies the managing process side of the state of termination and, according to the content of this information, the managing process side restarts the application. For this reason, only a restartable application can be restarted, so that the restarting of the terminated application can be reliably and smoothly performed to prevent the execution of any useless restarting process.

Furthermore, in cases where the state of the terminated application cannot be determined with the use of a relevant termination discriminator, restarting of the application is performed with the use of a forced restart determining means. For this reason, it is possible to compensate for an incomplete portion of the system.

Moreover, the frequency of restarting is counted and, when the frequency of restarting is higher than a preset restart frequency, the system deems that there is some reason which makes it inconvenient to perform restarting and any further restart attempts are stopped.

The present invention can be applied to a computer program, executable by means of a computer. Also in this case, the aforementioned effects will be accomplished by using this computer program.

What is claimed is:

1. An automatic application restarting system wherein a computer application is automatically restarted upon termination of said application, said system comprising:

termination discriminator designating means for designating a termination discriminator which indicates, upon the termination of said application, whether said application is terminated while it is restartable or non-restartable;

application termination detecting means for detecting said termination discriminator;

termination discriminator determining means for receiving said termination discriminator and determining whether said application is terminated while it is restartable or non-restartable as indicated by said termination discriminator when said application termination detecting means detects said termination discriminator; and application start-up means for automatically restarting said application when said termination discriminator determining means determines the restartability of said application.

2. The automatic application restarting system as set forth in claim 1, wherein said termination discriminator designating means designates said termination discriminator as non-restartable when said application terminates normally or terminates abnormally in an unrecoverable manner, and said termination discriminator designating means designates said termination discriminator as restartable when the termination of said application is recoverably abnormal.

3. The automatic application restarting system as set forth in claim 1, further comprising a forced restart determining means, said forced restart determining means determines that said application should be restarted when said termination discriminator determining means cannot determine said termination discriminator designated by said termination discriminator designating means.

4. The automatic application restarting system as set forth in claim 1, further comprising counter means for counting a frequency of restarting said terminated application, wherein said termination discriminator determining means does not determine that the application is to be restarted when the frequency of restarting as counted by said counter means exceeds a preset frequency.

5. An automatic application restarting system as set forth in claim 4, wherein said counter means resets the frequency of restarting said terminated application when said application is started first.

6. An automatic application restarting method, wherein a computer application is automatically restarted upon termination of said application, said method comprising the steps of:

designating a termination discriminator which indicates, upon the termination of said application, whether said application is terminated while it is restartable or non-restartable;

detecting said termination discriminator;

receiving said termination discriminator and determining whether said application is terminated while it is restartable or non-restartable as indicated by said termination discriminator; and automatically restarting said application upon determining the restartability of said application indicated by said termination discriminator.

7. A computer program stored in a recording medium and executable by a computer for automatically restarting a computer application and controlling said computer, said computer program comprising:

means for designating a termination discriminator which indicates, upon the termination of said application, whether said application is terminated while it is restartable or non-restartable;

means for detecting said termination discriminator;

means for receiving said termination discriminator and determining whether said application is terminated while it is restartable or non-restartable as indicated by said termination discriminator; and means for automatically restarting said application upon determining the restartability of said application indicated by said termination discriminator.

\* \* \* \* \*